(12) United States Patent
Bentley (10) Patent No.: US 6,450,005 B1
(45) Date of Patent: Sep. 17, 2002

(54) METHOD AND APPARATUS FOR THE CALIBRATION AND COMPENSATION OF SENSORS

(75) Inventor: Ian N. Bentley, New Ipswich, NH (US)

(73) Assignee: Honeywell International Inc.

( * ) Notice: Subject to any disclaimer, the term of this patent is extended or adjusted under 35 U.S.C. 154(b) by 0 days.

(21) Appl. No.: 09/746,098

(22) Filed: Dec. 21, 2000

(51) Int. Cl.$^7$ .............................................. G01N 31/00
(52) U.S. Cl. ...................................................... 73/1.59
(58) Field of Search ............................... 73/1.02, 1.06, 73/1.07, 1.57, 1.59, 1.61–1.64, 1.88

(56) References Cited

U.S. PATENT DOCUMENTS

| | | | |
|---|---|---|---|
| 4,151,738 A | * 5/1979 | Hyer et al. | .................... 73/1.07 |
| 4,481,804 A | * 11/1984 | Eberhard et al. | ............. 73/1.06 |
| 4,708,012 A | * 11/1987 | Folk et al. | ..................... 73/1.61 |
| 6,023,978 A | 2/2000 | Dauenhauer et al. | |
| 6,237,394 B1 | * 5/2001 | Harris et al. | .................. 73/1.62 |

OTHER PUBLICATIONS

MLX90308CAB Software Users Manual Rev 0.1, Sep. 8, 2000, pp. 1–21.
New ICs Revolutionize the Sensor Interface, Nov. 1, 2000, pp. 1–9 (http://www.maxim-ic.com/1st_pages/ENGJR32.htm).
90308 Fact Sheet (www.melexis.com), No date.
MLX90308CAB Programmable Sensor Interface Rev 2.0, Oct. 11, 2000, pp. 1–24, no date.
MLX90308CAB Programmable Sensor Interface—Product Profile, Nov. 1, 2000, no date, (http://www.melexis.com/site/products/90308.htm).
Model DC—Ultra Low Pressure Sensor (www.honeywell.com/sensing/products/di).

* cited by examiner

*Primary Examiner*—Robert Raevis
(74) *Attorney, Agent, or Firm*—Andrew A. Abeyta; Thomas V. DelRosario (57) ABSTRACT

The present invention discloses a method of using of a programmable circuit to calibrate a transducer. The programmable circuit is coupled to or communicates with a computer and to a testing station. The computer automatically varies the conditions of the testing station and programs the programmable circuit to produce a desired response. In another embodiment, a system is presented that can be used to measure various parameters that includes a programmable that may be mounted in the same package as a sensor. Such a system may include pressure sensors that are optimized to measure very low pressures.

6 Claims, 6 Drawing Sheets

(PRIOR ART)

METHOD AND APPARATUS FOR THE CALIBRATION AND COMPENSATION OF SENSORS

BACKGROUND OF THE INVENTION

1. Technical Field of the Invention

The present invention relates generally to sensing equipment and more particularly to an apparatus and a method of calibrating low pressure sensors.

2. Description of Related Art

Pressure transducers which use strain gauges in a Wheatstone Bridge configuration are well known in the art. Such pressure transducers may be configured to produce an output voltage or output current that is proportional to the pressure being sensed. The transducers will also typically have a specific range where the transducer can be used. For example, a transducer will have a rated cold temperature and a rated hot temperature and the transducer will be tested to ensure that it works properly within the rated temperature range. A similar situation occurs with respect to pressures, as a transducer will be rated and tested to function within a certain range of pressure.

Such pressure transducers may be sensitive to various disturbances, such as temperature changes, which, if uncompensated, will cause errors in the pressure reading. Temperature induced errors may be observed as a change in the output of the transducer as temperature varies with zero pressure applied, or as a change in the difference between full-scale output and zero pressure output as the temperature varies. These errors are known as "thermal effect on zero" (or "thermal effect on offset") and "thermal effect on span," respectively.

Methods are known in the art to compensate for such errors and typically require an initial characterization of the transducer to define any errors. Typically, at least two points from the output signal of the transducer are recorded as ambient temperature is varied over a predetermined range both with zero pressure applied and with a predetermined amount of pressure applied. The pressure applied is typically, but not necessarily, full-scale pressure, and the output is recorded at the same temperature points with zero pressure and with the applied pressure. Based on the output signals, the uncompensated thermal effects are calculated and used to derive the required amount of compensation.

There are several methods available to provide error compensation in a pressure transducer. One common method is to add resistors in series with the bridge supply voltage, and in series with or parallel to the individual bridge resistors. The resistors are chosen based on the particular thermal properties necessary to negate the observed thermal effects, and their values are calculated based on the uncompensated thermal measurements. Error compensation may also be accomplished by laser trimming resistors or thermistors to force voltage changes at the sensor. Another method, known as digital compensation, uses stored data to generate error-correction signals which are added to or subtracted from the uncompensated output of the bridge.

Error compensation to achieve accurate measurements, however, can be a costly and time-consuming process. Frequently, the process of characterizing the transducer, adding compensation, re-characterizing the transducer, and adjusting the compensation must be repeated several times to obtain the desired accuracy. This can be more difficult with particular transducer designs such as, in micro-machined, very low pressure, silicon sensors or those with full-scale pressures of 1 inch of $H_2O$ (250 pascals) or less.

Figure 1:
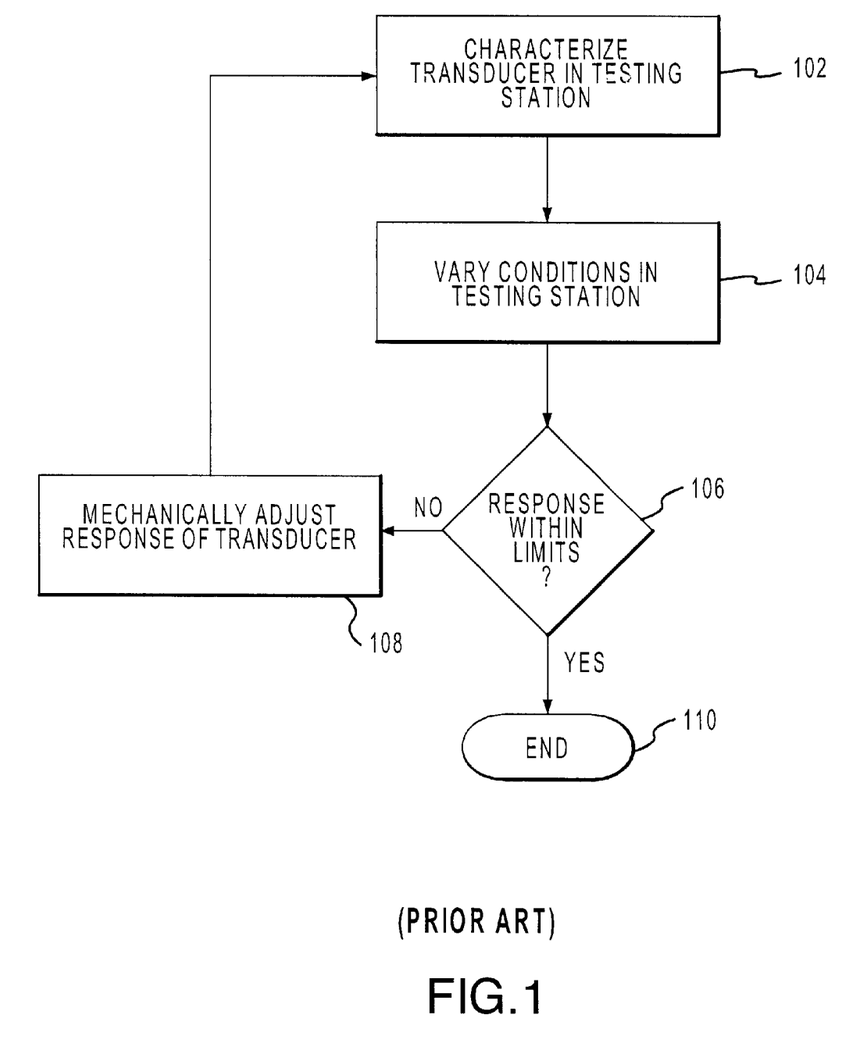
FIG. 1 presents a prior art method for calibrating a transducer.

FIG. 1 illustrates the process described above in the form of a flow chart. Initially, the transducer is brought into a testing apparatus where it is tested to characterize the transducer (step 102). For example, the transducer may be tested at zero pressure and room temperature (e.g., 25° C.). The temperature may then be varied to determine the output voltage as a function of temperature (step 104). In addition, the transducer may then be tested as to the output of the transducer with respect to changes in pressure. This test may or may not involve the use of an additional testing station. After this characterization step, it is determined if the transducer is operating properly (step 106). For example, the transducer may not be producing the correct output at zero pressure. In that case, the transducer would be adjusted through the use of, for example, laser trimming or the addition resistors to the supply voltage such that the response of the transducer is changed (step 108).

After the adjustment, the above steps are repeated to determine if the transducer is behaving in the desired manner. If the transducer is not properly calibrated to produce the correct output, the adjustment process must be repeated. Once the transducer is brought within specification, the process is ended (step 110), and another transducer is processed.

There are several shortcomings to the above-described process. The process is time consuming, as the transducer may have to be calibrated and re-calibrated several times to calibrate the sensor. In addition the calibration process may not be as precise as desired. For example, in order to properly calibrate a sensor, it may be necessary to adjust the resistance of a resistor to within 0.1 ohms by use of laser trimming. However, that degree of precision may not be possible because the mere measuring of the resistance may cause the resistance to change.

Such errors can be compensated for and there are several known methods for doing so. For example, U.S. Pat. No. 6,023,978, assigned to Honeywell International, discloses a pressure transducer that uses two sensors that are mechanically and electrically cross-coupled with each other such that errors associated with one sensor are compensated or substantially cancelled by errors associated with the other sensor.

However, such a transducer may still suffer from various errors. For example, a transducer is ideally calibrated such that the transducer produces a certain voltage at one pressure extreme (for example, 4.25 volts for maximum pressure) and another voltage at another pressure extreme (for example, 0.25 volts for zero pressure), possibly with a linear response between the extremes. In addition, the output may change with respect to temperature: a sensor in a cold environment may have different outputs for a particular pressure than a sensor in a warm environment at the same pressure. While a transducer such as that described in the '978 patent may adequately compensate for certain mechanical noise issues and gravity issues, such a transducer does not adequately address all of the issues respecting the calibration of the sensor.

Therefore, there is a need for a method and system for calibrating transducers system that results in a more precise calibration and that can be performed more quickly than traditional methods.

SUMMARY OF THE INVENTION

The present invention presents a system and method for meeting those needs. The system includes a circuit that is electrically coupled to a sensor. The circuit may be an application specific integrated circuit (ASIC) that may be programmable such that a desired result may be output by the ASIC based on readings of the sensor.

A method for calibrating a transducer is also disclosed. The transducer includes a sensor coupled to an ASIC. The transducer is coupled to a computer and placed within a testing chamber. The computer is further coupled to the testing chamber. Then various conditions can be set by the computer. The output of the sensor is evaluated to determine if the output is within a certain tolerance of an ideal output. If not, it is then determined if the output can be corrected by the programming of the ASIC. If the output can be corrected, then the ASIC is programmed to produce a desired output. Thereafter, the above steps can be repeated for a variety of different conditions.

BRIEF DESCRIPTION OF THE DRAWINGS

The present invention is illustrated by way of example, and not limitation, in the accompanying figures, in which like reference numbers indicate similar elements, and in which.

DETAILED DESCRIPTION OF EXEMPLARY EMBODIMENTS

The present invention may be described herein in terms of various functional components and various processing steps. It should be appreciated that such functional components may be realized by any number of hardware or structural components configured to perform the specified functions. For example, the present invention may employ various integrated components comprised of various electrical devices, e.g., resistors, transistors, capacitors, diodes and the like, whose values may be suitably configured for various intended purposes. In addition, the present invention may be practiced in any integrated circuit application where a calibration is desired. Such general applications that may be appreciated by those skilled in the art in light of the present disclosure are not described in detail herein. However for purposes of illustration only, exemplary embodiments of the present invention will be described herein in connection with pressure sensors. Further, it should be noted that while various components may be suitably coupled or connected to other components within exemplary circuits, such connections and couplings can be realized by direct connection between components, or by connection through other components and devices located therebetween.

Several companies manufacture an application specific integrated circuit that may be used to aid in the calibration of transducers. For example, Melexis makes a product called the MLX90308CAB, which is a dedicated microcontroller which performs signal conditioning. In such a product, compensation values are stored in EEPROM (electronically erasable programmable read only memory). Programming the MLX90308CAB or other similar ASIC involves the use of a computer with a specialized interface circuit. Through programming of the EEPROM, the ASIC can provide an output of an absolute voltage, relative voltage, or current based on various inputs.

Figure 6:
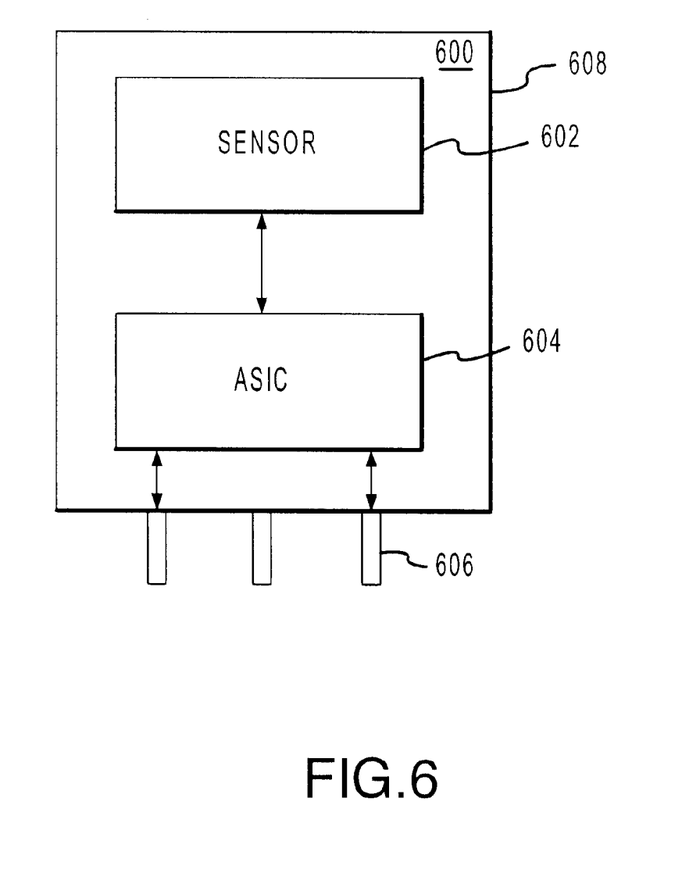
FIG. 6 illustrates a block diagram of an embodiment of the present invention.

The present invention incorporates an ASIC, such as that described above, into a transducer system. Referring to FIG. 6, a block diagram overview of an exemplary embodiment of the invention is shown. A transducer 600 contains a sensor 602, an ASIC 604, and input/output terminals 606 enclosed within a case 608. Sensor 602 is coupled to, or communicates with, ASIC 604 such that, inter alia, the output of sensor 602 is input to ASIC 604. ASIC 604 processes the input it receives from sensor 602 such that an output voltage (or output current, if desired) is provided to terminals 606 that is related to the pressure read by sensor 602, but is corrected.

Transducer 600 is used as one would use any other transducer. However, instead of the output being read from the sensors, the output of the ASIC is what is available at terminals 606. Terminals 606 can also be used to program the ASIC in order to ensure that transducer 600 produces the correct output voltage for a certain pressure.

Although ASIC 604 is shown as integrated into the same package 608 as sensor 602, it should be understood that the operation of the invention is not affected if ASIC 604 is external to the packaging of sensor 602. However, placing ASIC 604 into package 608 enables transducer 600 to form a self-contained solution to the various possible calibration problems. In addition, ASIC 604 may be replaced by a similar circuit that performs functions such as those performed by an ASIC.

Figure 2:
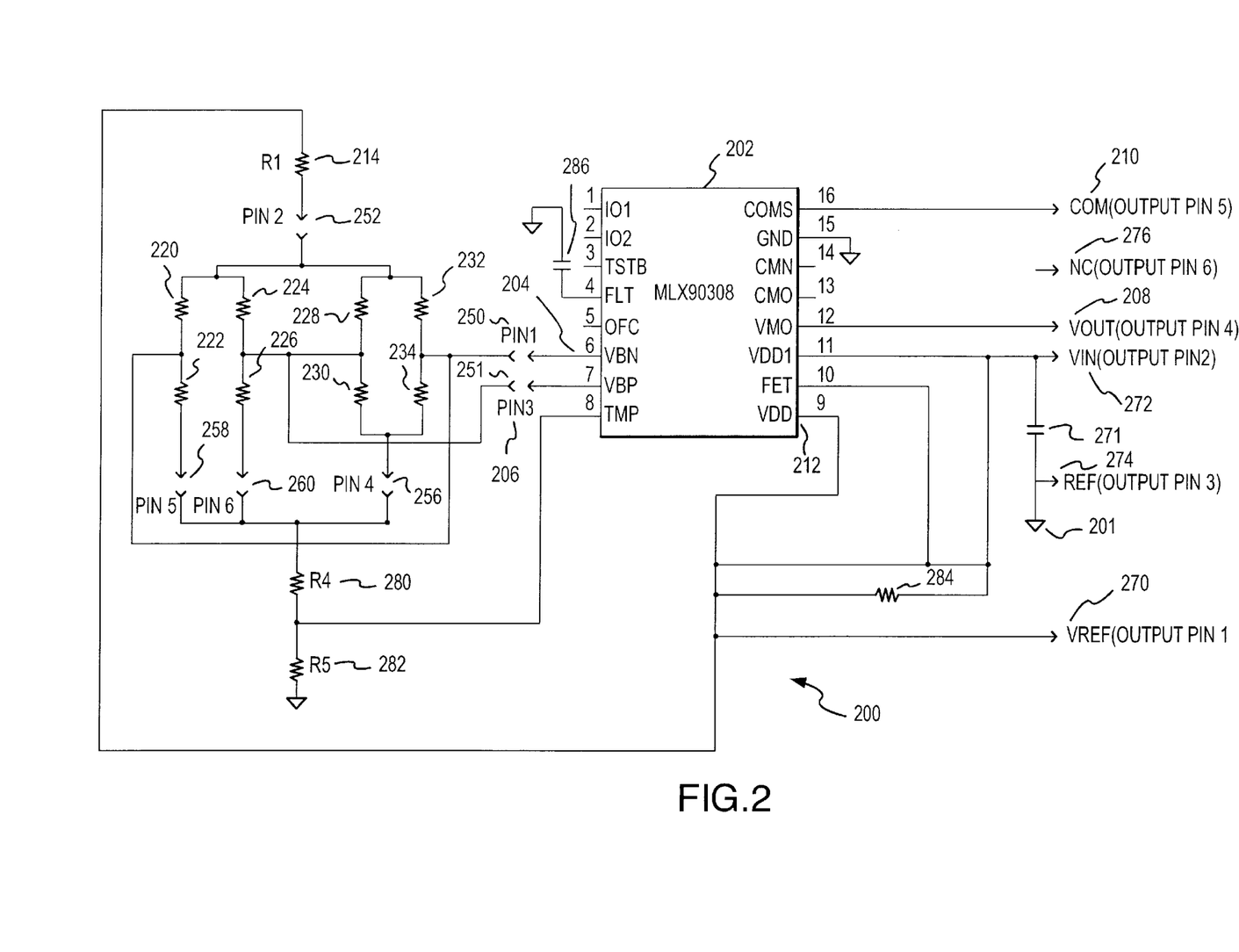
FIG. 2 presents an exemplary schematic of an embodiment of the present invention.

Referring now to FIG. 2, an exemplary embodiment of a transducer 200 of the present invention is depicted in more detail. ASIC 202 is depicted as a MELEXIS MLX90308. However, it should be understood that various types of ASICs, both from MELEXIS and from other manufacturers, may be used without affecting the operation of the invention.

The sensors comprise resistors 220, 222, 224, 226, 228, 230, 232, and 234, which may be placed in a wheatstone bridge configuration. The sensors of the prior art typically communicate through the use of pin 1 (250), pin 2 (252), pin 3 (254), pin 4 (256), pin 5 (258), and pin 6 (260). In this embodiment, however, the sensors communicate through ASIC 202.

The output of the pressure sensors is coupled to or communicates with the negative input 204 and the positive input 206 of ASIC 202. ASIC 202 supplies power to the sensors through a regulated supply voltage pin 212 and a resistor 214.

The output pins of transducer 200 are coupled to ASIC 202: Output pin 1 (270) supplies a reference voltage that is accessible to equipment coupled to transducer 200. Output pin 2 (272) may serve as an unregulated supply voltage. Output pin 2 is coupled to ground 201 through capacitor 271. Output pin 3 (274) is coupled to ground and serves as a reference ground for the system. The output of ASIC 202 is obtained at output pin 4 (208), which thus represents the output of transducer 200 based on the pressure sensed by the sensors, as processed by ASIC 202. Output pin 5 (210) is coupled to ASIC 202 to enable serial communication to the ASIC for reading and writing to the EEPROM of ASIC 202. Output pin 6 (276) remains floating and is present for compatibility purposes with devices that connect to prior art transducer systems.

In the embodiment described in FIG. 2, the output of the sensors is processed through ASIC 202. The output of ASIC 202 can be accessed through output pins 270, 272, 274, 208, 210, and 276 of transducer 200. In this manner, ASIC 202 can output a corrected voltage based on the readings of the sensors. Thus, one ensures that transducer 200 outputs, e.g., 4.25 volts at a certain pressure and 0.25 volts at another predetermined pressure.

Figure 3:
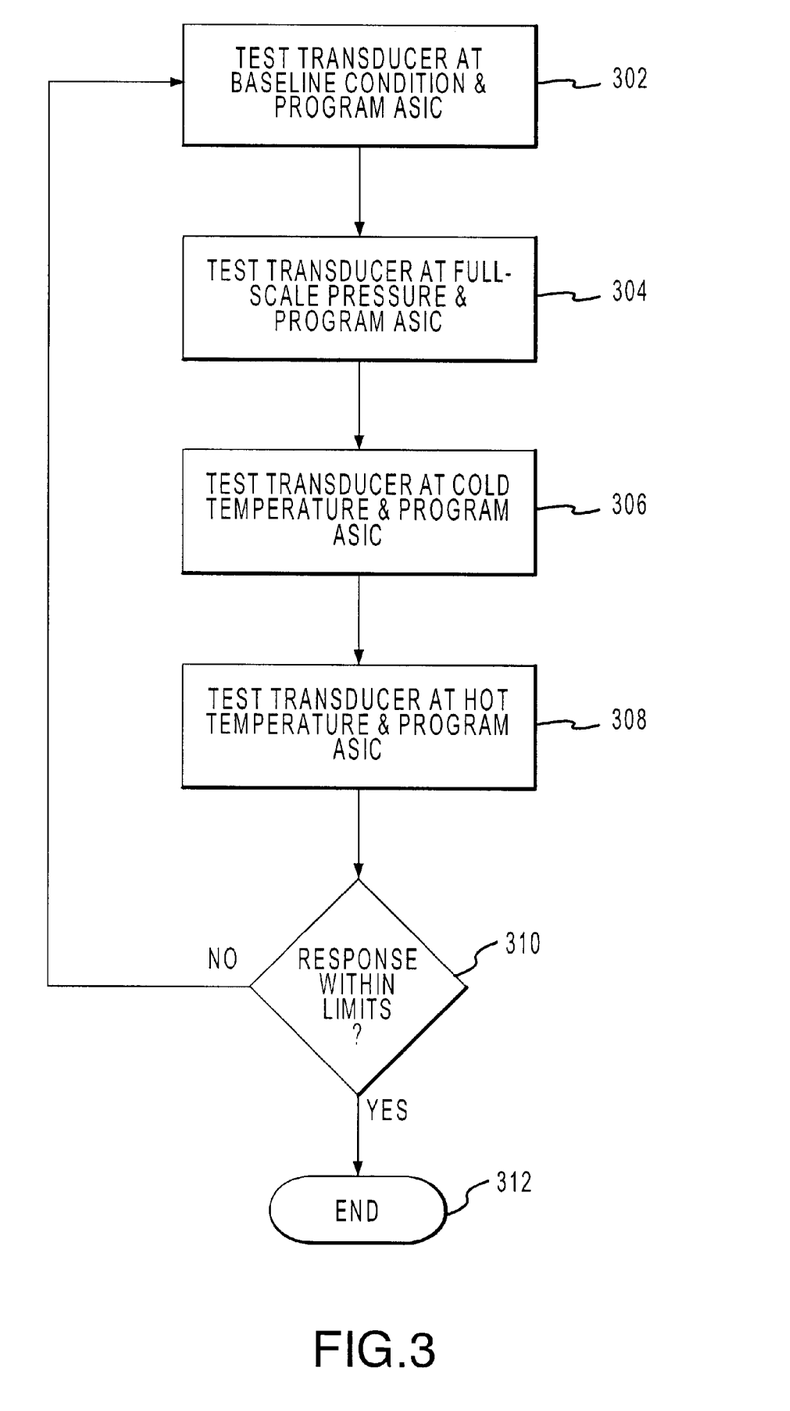
FIG. 3 presents an exemplary flowchart illustrating the operation of an embodiment of the present invention.

In typical usage, ASIC 202 can be programmed, prior to use, to produce a desired output response based on the pressure being sensed. A method of programming transducer 200 is shown in FIG. 3, a flowchart illustrating an overview of an exemplary calibration of a transducer. A typical test sequence starts at a baseline condition, such as room temperature (e.g., 25° C.) and zero pressure, where the output of the transducer is measured and the ASIC is programmed to produce the correct output for that condition (step 302). Then, full-scale pressure is applied to the transducer, the transducer output is measured, and the ASIC is again programmed to produce the correct output for the condition (step 304). The above two sequences may be repeated at the rated cold temperature of the transducer (step 306) and at the rated hot temperature of the transducer (step 308). After all of the testing and programming, if the transducer is not operating properly, the above steps may be repeated to alter the output of transducer 200 (step 310). Once the transducer is operating properly, the testing/calibration session is terminated (step 312).

The programming of ASIC 202 may occur, for example, through the use of a connection to an EEPROM located on ASIC 202. Because the EEPROM is readily eraseable and re-writeable, the programming can be done in a relatively quick and easy manner. In addition to an initial calibration, a transducer can be re-calibrated if, for some reason, the transducer begins to behave in a different or unexpected manner. Because ASIC 202 is coupled to the transducer, adjustments can be made to the ASIC, effecting the output of the transducer, using only a single test chamber. In contrast, prior art methods often relied on testing in a test chamber followed by adjustments made using another machine, followed by more testing in the test chamber, which is a very time consuming process.

As those of skill in the art will now realize, the above described process may be computerized such that the a be-described testing, programming, and re-testing occurs in an automated fashion. By automating the process, transducers with the desired characteristics can be produced at a higher rate.

The computerization process operates by coupling a computer unit to both the test chamber and to the transducer. In that manner, the computer is able to control the temperature and the pressure in the test chamber while simultaneously measuring the output of the transducer.

Figure 4:
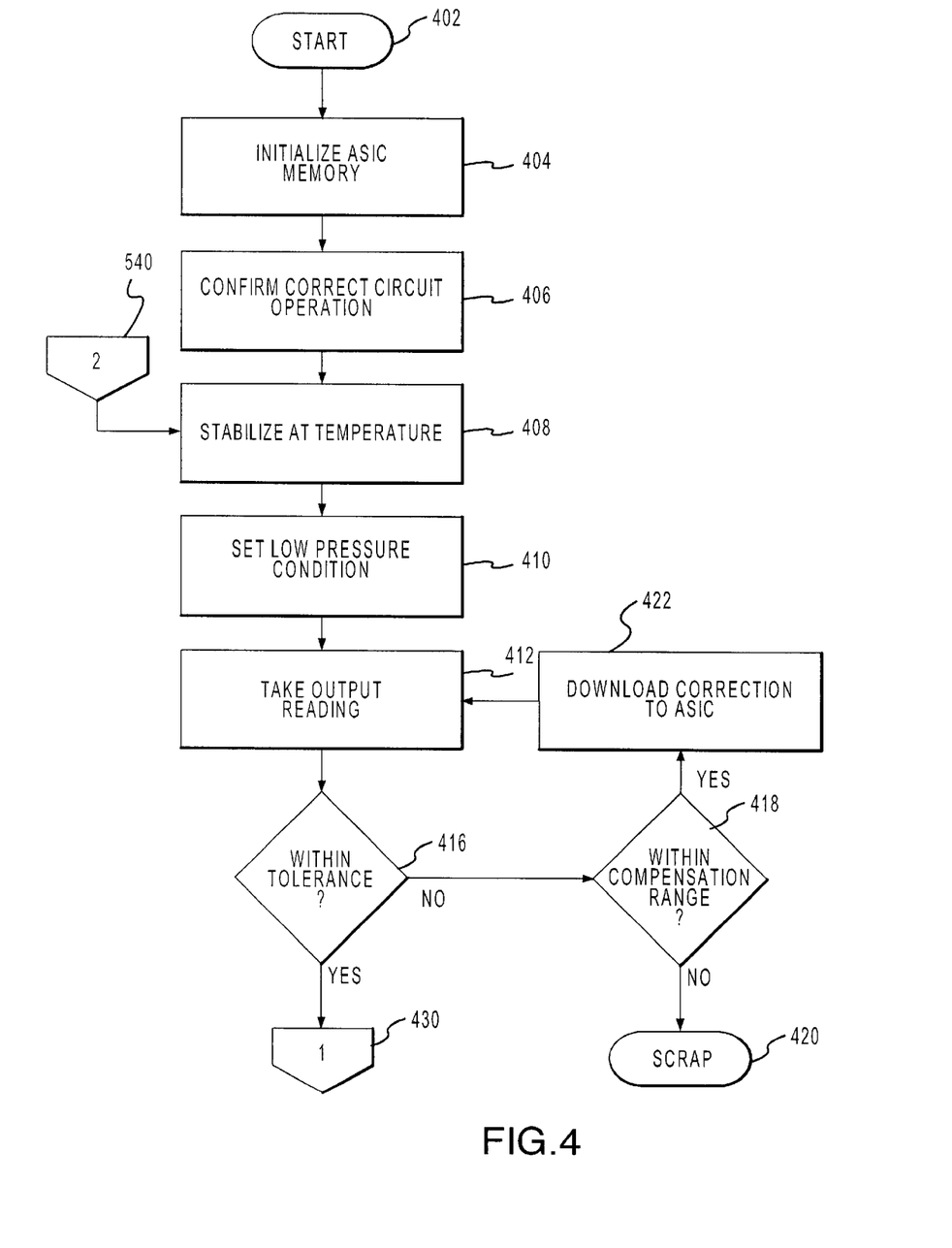
FIG. 4 presents an exemplary flowchart illustrating the operation of a computer program embodiment of the present invention.

With reference to FIG. 4, a flowchart describing the process of an exemplary computer program used to calibrate a transducer containing an embodiment of the present invention is shown. After the transducer is attached to the computer running the program and placed in a test chamber, the program is started (step 402). After the ASIC memory is initialized (step 404), the correct circuit operation is confirmed (step 406). The test chamber is then set to a predetermined temperature and the temperature is stabilized (step 408).

Once the temperature in the chamber has been stabilized, the pressure is set to a predetermined level (step 410). The output of the transducer is then read via the computer linkage to the transducer (step 412).

It is then determined if the transducer is operating within predetermined tolerances (step 416). For example, it may be desirable to have an accuracy of 3%, such that the output voltage is within 3 % of the optimum output for a given condition. For some applications, higher accuracies, such as approximately 0.25% may be desired. Thereafter, it is determined whether or not the transducer is within the compensation range (step 418). There are limits to the amount of correction that an ASIC can supply to a transducer. Beyond those limits, the transducer is deemed unfit for service and the transducer is scrapped, as the output cannot be compensated to produce a desired output (step 420). Within those limits, the transducer is corrected through the transmission of a correction to the ASIC (step 422). Then the output of the transducer is determined again (step 416) and the above steps are repeated until the transducer is operating within tolerance (step 430).

Figure 5:
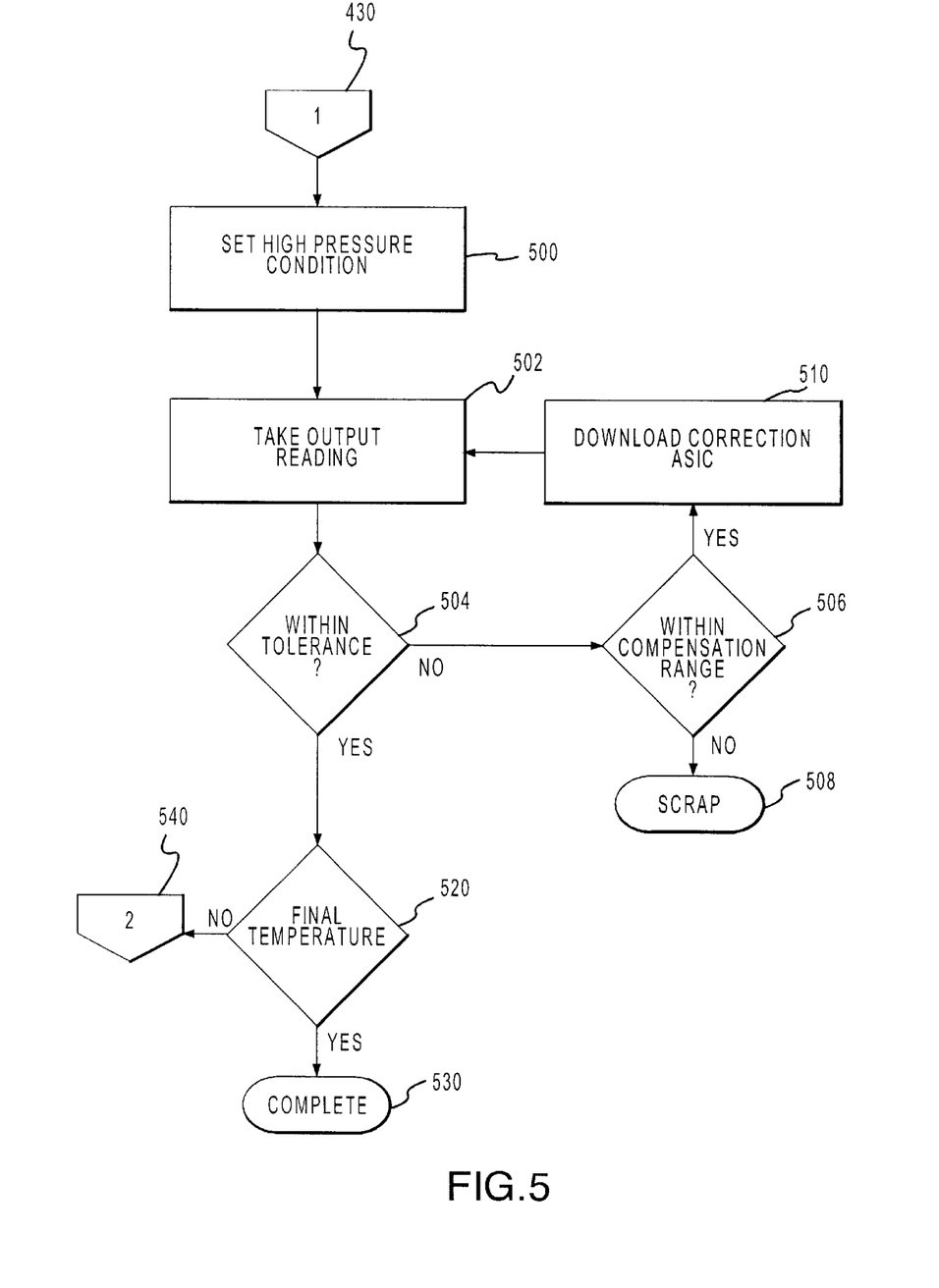
FIG. 5 presents the continuation of the flowchart of FIG. 4.

With reference to FIG. 5, once the transducer is operating at tolerance at the low pressure condition, a high pressure condition is set (step 500). Then, in a manner similar to that described above, the transducer is tested. First, the output reading is determined (step 502). Then the reading is analyzed to determine if the transducer is operating within a predetermined tolerance (step 504). If the transducer is not within tolerance, it is determined whether or not the output of the transducer can be corrected (step 506). If not, the transducer is deemed faulty and is scrapped (step 508). If the transducer output can be corrected, the ASIC is programmed such in a manner that should result in the proper operation of the transducer (step 510). Then the transducer is tested again to determine if the re-programming has corrected the transducer (step 502).

Once the transducer is operating properly at the high pressure condition at the predetermined temperature, it is determined whether or not there is an additional temperature at which to perform the test sequence (step 520). If not, the transducer is complete (step 530). However, if there is an additional temperature to be tested, the temperature is adjusted and testing continues at the low pressure condition (steps 408, 410). The above sequence is repeated until all temperature conditions are tested.

At the completion of the computerized process, the result is a transducer that produces a desired output for the entire range of pressures throughout a range of temperature conditions. In addition, the result is accomplished with little need for human intervention and less possibility for errors, than manually controlling the ASIC and the test chamber.

To further speed the process of calibrating sensors, it is also possible to calibrate multiple sensors in a single test chamber. Each transducer could be coupled to a computer system. Preferably, a single computer system would be used, with each transducer coupled to the same computer system. The computer controls the pressure and temperature of the test chamber, as described above. Once the process is completed for one transducer in the test chamber, the computer can then begin monitoring and re-programming another transducer in the test chamber. In the alternative, while the pressure and temperature are being controlled by the computer, several transducers can be monitored and re-programmed simultaneously.

In the computerized process, it is possible to store information for each transducer that is calibrated. In this manner, one would be to track the performance of the sensors. Furthermore, one would be able to, inter alia, improve the production of the sensors, such that less compensation by the ASIC is needed.

The above description presents exemplary modes contemplated in carrying out the invention. The techniques described above are, however, susceptible to modifications and alternate constructions from the embodiments shown above. Other variations and modifications of the present invention will be apparent to those of ordinary skill in the art, and it is the intent of the appended claims that such variations and modifications be covered. For example, although the present invention has been described with respect to pressure sensors and transducers, it should be noted that the methods and apparatus disclosed in the present application are also applicable to various other types of sensors, including temperature sensors, voltage sensors, current sensors, acceleration sensors, and the like. In addition, the present invention is not limited to applications involving sensors using a wheatstone bridge configuration, but includes other types of sensors as well. In addition, although the use of an ASIC has been described, it should be noted that various types of circuits that perform functions similar to those described in the present invention, may be used instead.

Consequently, it is not the intention to limit the invention to the particular embodiments disclosed. On the contrary, the invention is intended to cover all modifications and alternate constructions falling within the scope of the invention, as expressed in the following claims when read in light of the description and drawings. No element described in this specification is necessary for the practice of the invention unless expressly described herein as "essential" or "required."

I claim:

1. A method for calibrating a transducer comprising a sensor in communication with a programmable circuit, said method comprising:

connecting a computer to said transducer such that the computer is in electrical communication with said transducer;

placing said transducer in a test chamber;

coupling said computer with said test chamber;

setting a condition;

evaluating the output of the sensor to determine if the output is within a predetermined tolerance;

determining if the output of the sensor can be corrected, if the output is not within a predetermined tolerance;

programming said programmable circuit such that the output of the transducer is within a predetermined range, if the output can be corrected; and repeating said setting, evaluating, determining, and programming steps for a different condition.

2. The method of claim 1 wherein said plurality of conditions comprises a low pressure condition, a high pressure condition, a low temperature condition, and a high temperature condition.

3. The method of claim 1 wherein said transducer comprises a pressure sensing transducer.

4. The method of claim 3 wherein said transducer is optimized to measure low pressures.

5. The method of claim 1 wherein said programmable circuit is an application specific integrated circuit.

6. The method of claim 1 further comprising:

ensuring the output of the transducer is linear throughout the plurality of operating conditions.

* * * * *